United States Patent [19]
Ineich et al.

[11] Patent Number: 5,507,552
[45] Date of Patent: Apr. 16, 1996

[54] ROTATABLE SEAT BELT BUCKLE MOUNTING BRACKET FOR A VEHICLE SEAT ADJUSTER WITH A CATCHER BRACKET BUCKLE BRACE

[75] Inventors: Jeffrey D. Ineich, Waterford; Stephen D. Crawford, Garden City, both of Mich.

[73] Assignee: ITT Corporation, New York, N.Y.

[21] Appl. No.: 177,257

[22] Filed: Jan. 4, 1994

[51] Int. Cl.⁶ ............................................... B60N 2/42
[52] U.S. Cl. ................... 297/216.1; 297/472; 248/430
[58] Field of Search ............................. 297/216.1, 472, 297/473; 248/429, 430, 548

[56] References Cited

U.S. PATENT DOCUMENTS

| | | | |
|---|---|---|---|
| 3,106,989 | 10/1963 | Fuchs | 188/1 |
| 3,457,234 | 7/1969 | Gianatasio | 260/75 |
| 3,845,987 | 11/1974 | Bashford | 297/472 X |
| 4,274,293 | 6/1981 | Ruger | 74/89.15 |
| 4,448,381 | 5/1984 | Anspaugh et al. | 248/394 |
| 4,487,459 | 12/1984 | Rees | 308/3 R |
| 4,572,469 | 2/1986 | Rees | 248/430 |
| 4,623,192 | 11/1986 | Koide et al. | |
| 4,676,555 | 6/1987 | Tokugawa | 297/473 |
| 4,676,556 | 6/1987 | Yamanoi et al. | 297/473 |
| 4,726,617 | 2/1988 | Nishimura | 296/63 |
| 4,757,969 | 7/1988 | Tolfsen | 248/499 |
| 4,802,374 | 2/1989 | Hamelin et al. | 74/89.14 |
| 4,805,866 | 2/1989 | Aihara et al. | 248/429 |
| 4,821,991 | 4/1989 | Aihara et al. | 248/430 |
| 4,832,409 | 5/1989 | Borlinghaus et al. | 297/468 |
| 4,838,511 | 6/1989 | Terada et al. | 248/429 |
| 4,939,945 | 7/1990 | Ryder et al. | 74/89.13 |
| 4,948,189 | 8/1990 | Terada et al. | 296/65.1 |
| 4,949,585 | 8/1990 | Dauvegne et al. | 74/89.15 |
| 4,964,608 | 10/1990 | Rogala et al. | 248/429 |
| 4,969,622 | 11/1990 | Münchow et al. | 248/429 |
| 5,014,958 | 5/1991 | Harney | 248/394 |
| 5,048,787 | 9/1991 | Saitoh | 248/430 |
| 5,048,886 | 9/1991 | Ito et al. | 296/65.1 |
| 5,076,529 | 12/1991 | Dove et al. | 248/429 |
| 5,102,197 | 4/1992 | Itsuki | 297/468 |
| 5,144,849 | 9/1992 | Aihara et al. | 74/89.14 |
| 5,150,872 | 9/1992 | Isomura | 248/429 |

FOREIGN PATENT DOCUMENTS

| | | |
|---|---|---|
| 0037726 | 10/1981 | European Pat. Off. |
| 0189531 | 8/1986 | European Pat. Off. |
| 0197638 | 10/1986 | European Pat. Off. |
| 0277069 | 8/1988 | European Pat. Off. |
| 0281071 | 9/1988 | European Pat. Off. |
| 0306122 | 3/1989 | European Pat. Off. |
| 0317381 | 5/1989 | European Pat. Off. |

(List continued on next page.)

*Primary Examiner*—Peter R. Brown
*Attorney, Agent, or Firm*—Robert P. Seitter; J. Gordon Lewis

[57] ABSTRACT

A track assembly for a vehicle includes an upper track slidably mounted in a lower track. A seat belt buckle mounting bracket is attached to the upper track and connects a fixed seat belt to the upper track. The seat belt buckle mounting bracket includes first and second angularly disposed legs, with the first leg attached to the upper track and the second leg attached to a fixed seat belt buckle. The attachment structure mounts the seat belt buckle mounting bracket in a first, normal operating position in which the second leg of the bracket extends upward from a side wall of the upper track. The attachment structure permits the seat belt buckle mounting bracket to rotate from the first position under a force applied through the fixed seat belt to a second position in which the second leg of the bracket is substantially aligned with the longitudinal axis of the upper track to place the first and second legs of the bracket in tension with the applied force. The second position provides a strong geometry position for the seat belt buckle mounting bracket. The attachment structure also includes a catcher strap connecting the seat belt buckle mounting bracket and upper track to the rear torsion bar or tube to increase the ultimate load before failure, and to transfer the load in a manner so that the load is shared between the buckle bracket and the rear torsion bar for subsequent transmission to the rear riser.

20 Claims, 7 Drawing Sheets

FOREIGN PATENT DOCUMENTS

| | | |
|---|---|---|
| 0404665 | 12/1990 | European Pat. Off. . |
| 9322156 | 11/1993 | European Pat. Off. . |
| 2429125 | 1/1980 | France . |
| 2545763 | 4/1977 | Germany . |
| 2806998 | 8/1979 | Germany . |
| 3312480 | 10/1984 | Germany . |
| 3439076 | 4/1986 | Germany . |
| 3614457 | 11/1987 | Germany . |
| 3715861 | 12/1988 | Germany . |
| 57-178954 | 11/1982 | Japan . |
| 783800 | 3/1955 | United Kingdom . |
| 2193629 | 2/1988 | United Kingdom . |
| 2245333 | 1/1992 | United Kingdom . |

ROTATABLE SEAT BELT BUCKLE MOUNTING BRACKET FOR A VEHICLE SEAT ADJUSTER WITH A CATCHER BRACKET BUCKLE BRACE

RELATED APPLICATIONS

The present application is related to application Ser. No. 07/876,549 filed Apr. 30, 1992 entitled POWER SEAT ADJUSTER WITH DRIVE GEAR FORCE BYPASS by inventors Derek K. Gauger, Kirk K. Horvet and Phillip Chaban, now U.S. Pat. No. 5,316,258 and application Ser. No. 07/876,616 filed Apr. 30, 1992 entitled ROTATABLE SEAT BELT BUCKLE MOUNTING BRACKET FOR VEHICLE SEAT ADJUSTER by inventors Derek K. Gauger, Stephen D. Crawford and Jeffrey D. Ineich, issued as U.S. Pat. No. 5,303,983 all of these applications were assignable, at the time the inventions were made, to a common assignee, namely ITT Corporation.

FIELD OF THE INVENTION

The present invention relates, in general, to vehicle seats, and, more specifically, to seat belt attachments to vehicle seat adjusters.

BACKGROUND OF THE INVENTION

Seat adjusters are used on the front seat(s) of automotive vehicles to provide selective horizontal fore and aft, vertical and/or recliner movements of the seat. Such seat adjusters carry an upper support frame which supports the seat bottom and sometimes the seat back of the vehicle seat. The upper support frame is mounted on first and second, spaced track assemblies, each formed of an upper track which is connected to the upper support frame and which is slidably mounted in a lower track anchored to the vehicle floor. In a power seat adjuster, a drive mechanism, typically formed of a bi-directional electric motor, is mounted between the track assemblies and rotates a pair of drive shafts extending outward from the motor to a gear assembly or box mounted on each upper track. In one arrangement, the gear box rotates a lead screw extending below each upper track. A drive block mounted to the lower track threadingly receives the lead screw to cause reciprocal movement of the upper track and the attached upper support frame upon selective energization of the drive motor. Other drive mechanisms may also be incorporated into the power seat adjuster to provide vertical movement of the seat frame as well as pivotal movement of the seat back with respect to the seat bottom.

Although such seat adjusters provide easy fore and aft movement of the seat in the lower tracks, it is imperative that the seat remain in a fixed, stationary position during a collision, such as a frontal collision, in order to prevent injury to the passenger using the seat. As a result, the weight and size of the seat adjuster components are selected to provide a maximum amount of strength to resist any movement under the high impact forces transmitted to the seat through the seat belt during a vehicle collision. Thus, the individual tracks, the torsion tubes or bars typically extending between and interconnecting the spaced upper tracks into a rigid structure and the other components of the seat adjuster are made with stronger materials and greater thicknesses and dimensions to provide the requisite amount of strength.

In current usage, a fixed seat belt buckle mounting bracket is mounted on the rear end of one of the movable upper tracks. The seat belt buckle mounting brackets typically have an L-shape and are fixedly attached to the upper track by welding or by fasteners. One leg of the bracket is attached directly to the upper track, while the second leg extends integrally from the first leg upward from the upper track.

This arrangement provides a stiffener for the upper track as well as providing a retention device for attaching a fixed seat belt carrying a bracket which receives the tongue of a corresponding seat belt portion extendably and retractably mounted on a reel.

However, due to the attachment of the seat belt buckle mounting bracket on the upper track, forward movement of the passenger during a frontal vehicle collision exerts a load on the seat belt which is transferred through the seat belt buckle mounting bracket to the upper track of the seat adjuster. This load creates a high stress at stress riser points formed at the compound bend in the seat belt buckle mounting bracket between the first and second legs of the bracket. Any tool marks, cracks, etc., at the bend, which typically is formed with a relief, are subject to fracture under such loads.

Thus, it would be desirable to provide an upper track for a vehicle seat adjuster which has an improved seat belt buckle attachment means which overcomes the problems of previously devised seat belt buckle attachment means. It would also be desirable to provide an upper track of a seat adjuster having a seat belt buckle mounting bracket which is designed to change its geometry and/or position under load from a weak geometry position to a stronger geometry position. Furthermore, it would be desirable to provide a means for transferring load from the seat belt buckle attachment mounting bracket and upper track to the torsion bar assembly of the seat. It would also be desirable to gain higher loads during static loading, and greater reliability in the buckle system. In addition, it would be desirable to improve manufacturability by eliminating welds and reducing installation processing.

SUMMARY OF THE INVENTION

The present invention is a track assembly for a vehicle seat adjuster which has an improved seat belt buckle attachment means whose geometry changes under load to a strong, high strength geometry position to prevent fracture or breakage of the seat belt buckle attachment means and also transfers the load from the seat belt buckle attachment assembly and upper track to the torsion bar assembly.

In a preferred embodiment, the track assembly includes a stationary lower track which is adapted to be anchored to the floor pan of a vehicle. An upper track is adapted to support a vehicle seat and is movably mounted on the lower track. Means are provided for adjusting the upper track relative to the lower track for fore and aft movement of the upper track in the lower track. Seat belt buckle attachment means are mounted on the upper track for attaching a fixed seat belt buckle to the upper track.

The seat belt buckle attachment means includes a member having first and second angularly disposed legs. The second leg is adapted to be attached to a fixed seat belt buckle. Means are provided for fixedly attaching the first leg to the upper track in a first, normal operating position and for allowing rotation of the member to a second position relative to the upper track under a predetermined force imposed on the member through the seat belt buckle attached thereto to place the first and second legs of the member in tension.

In a preferred embodiment, the seat belt buckle attachment means is an integral, one-piece member with the first and second legs being disposed at an obtuse angle with respect to each other. In the first, normal operating position, the second leg extends upward from the upper track and is disposed adjacent to a side wall of the upper track. In the second position, the second leg is disposed substantially co-axial with the longitudinal axis of the upper track to place the first and second legs of the member in tension which presents a stronger geometry position for the seat belt buckle mounting bracket and which has a higher strength to resist fracture, deformation, etc.

A catcher bracket buckle brace means is provided to connect the seat belt buckle attachment means and upper track to the torsion bar or tube assembly. The catcher bracket buckle brace means preferably includes an elongated strap connected to the seat belt buckle attachment means and upper track at both ends and wrapped around the rear torsion bar intermediate the ends of the strap. During a frontal collision, the strap transfers load from the seat belt buckle attachment means and the upper track to the rear torsion bar assembly, thereby increasing the amount of load carried through the structure before failure.

The seat belt buckle mounting bracket employed in a track assembly for a vehicle seat adjuster according to the present invention overcomes problems associated with previously devised seat belt buckle mounting brackets that are attached in a fixed and stationary manner to the movable upper track of a vehicle seat adjuster. By rotatably mounting the seat belt buckle mounting bracket to the upper track, the seat belt buckle mounting bracket can rotate under a load imposed on the seat belt buckle mounting bracket through the seat belt to a stronger geometry position which resists fracture or breakage and which insures that the seat belt buckle mounting bracket remains attached to the upper track of the track assembly during a frontal vehicle collision and despite any deformation or upward movement of the upper track with respect to the stationary and fixed lower track. In addition, the catcher bracket buckle brace means transfers the load effectively from the seat belt buckle mounting bracket and upper track to the rear torsion bar assembly for increased load capabilities during frontal vehicle collisions.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
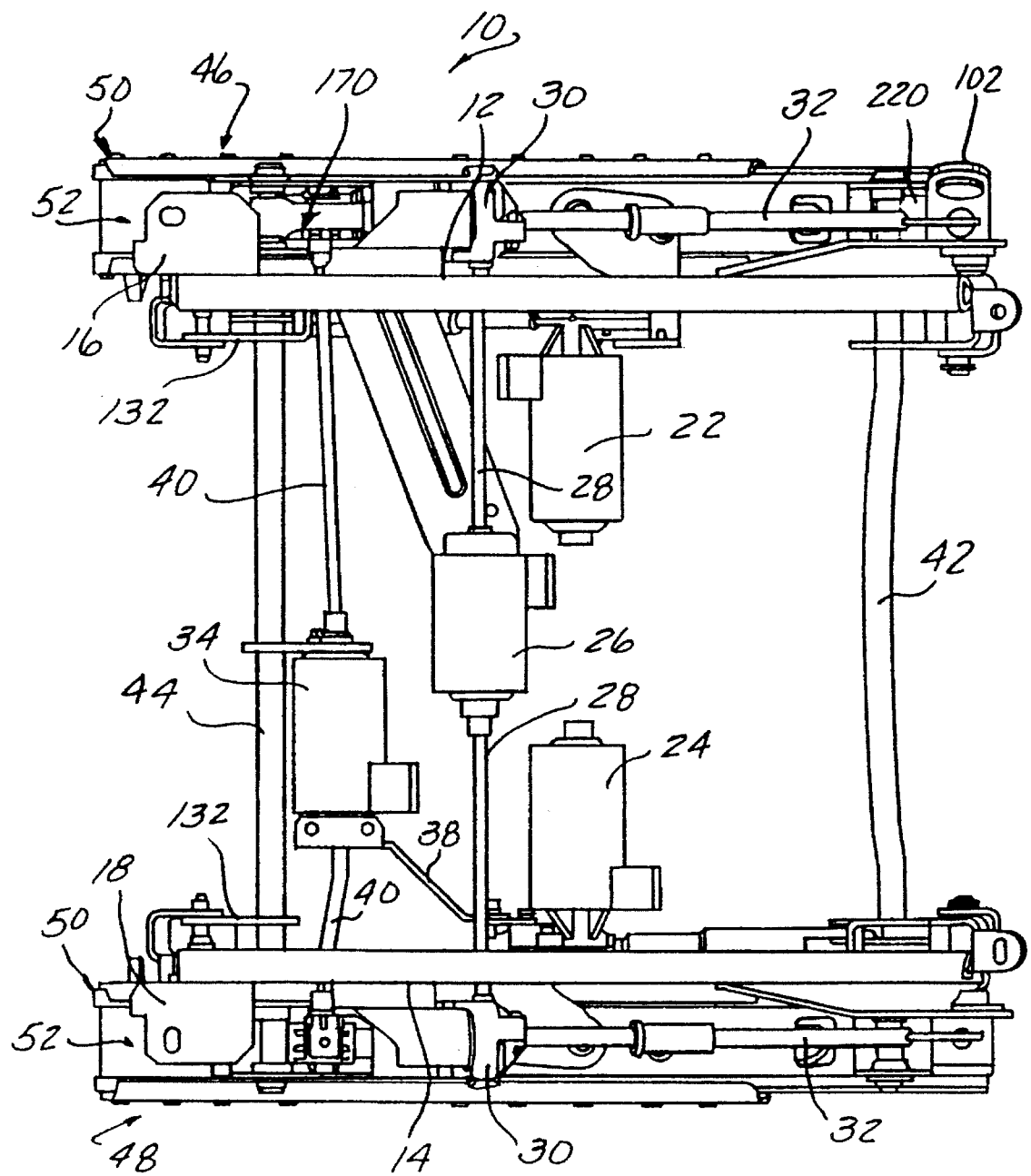
FIG. 1 is a plan view of a driver's side vehicle seat adjuster incorporating the seat belt buckle bracket of the present invention on the inboard upper track in the upper right hand corner as illustrated.
Figure 2:
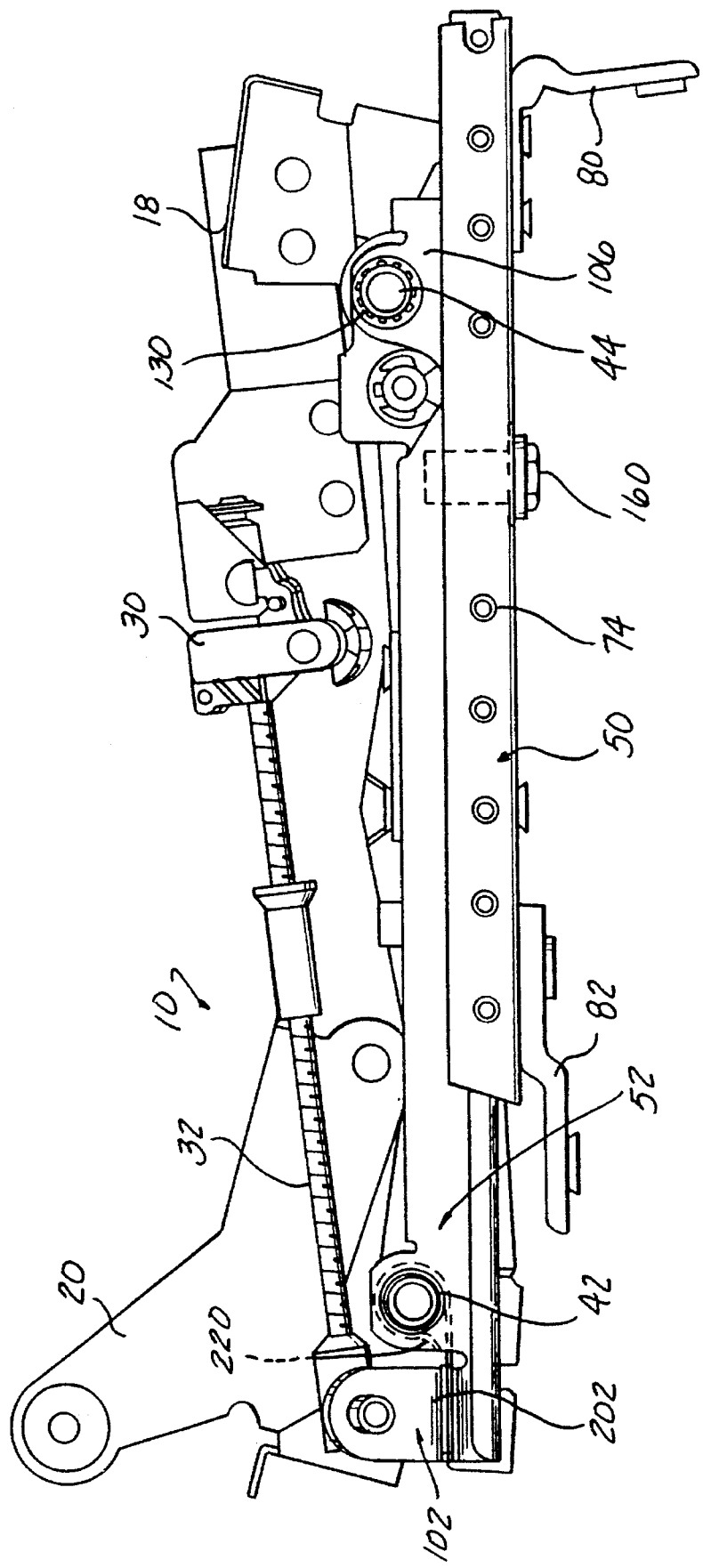
FIG. 2 is a side elevational view of the vehicle seat adjuster shown in FIG. 1.

Referring now to the drawing, and to FIGS. 1 and 2 in particular, there is illustrated a seat adjuster 10 which variably positions an automotive vehicle seat in any user selected position. By way of illustration and not limitation, the seat adjuster 10 depicted is a power seat adjuster, and is a so-called "eight-way" adjuster providing horizontal fore/aft, vertical up and down movement of separate front and rear portions of the adjuster as well as pivotal tilting of the seat back with respect to the seat bottom. It will be understood, however, that the present invention described hereafter is employable with either a manual or a power seat adjuster which includes at least a horizontal fore/aft movement and any number of other movements. In addition, the catcher bracket buckle brace of the present invention can be employed on the inboard upper track assembly of either the driver's side, or the passenger's side, vehicle seat.

As is conventional, the seat adjuster 10 supports a conventional vehicle seat, not shown, which includes a seat bottom and a seat back. An upper support frame is provided on the seat adjuster 10 for supporting and connecting the seat bottom and seat back to the seat adjuster 10. The upper support frame includes a pair of spaced, longitudinally extending frame members or rails 12 and 14. Mounting brackets 16 and 18, for example, are mounted on the ends of the frame members 12 and 14, respectively, and provide a mounting surface for connecting the seat bottom to the upper support frame. A pair of hinge plates 20 are also mounted on the upper support frame and provide a pivot connection between the seat back and seat bottom to permit selective tilting or pivotal movement of the seat back with respect to the seat bottom as is typical in so-called "seat recliners".

Various drive assemblies are depicted mounted on the seat adjuster 10 to provide selective movement of the seat adjuster 10 along various axes. For example, front and rear vertical drive motors 22 and 24, respectively, are mounted on the seat adjuster 10 and connected to conventional lead screws and drive blocks or nuts to move front and rear portions of the vehicle seat to provide selective vertical adjustment of the front and rear portions of the vehicle seat. In addition, a recliner drive motor 26 is interconnected by a pair of rotatable drive shafts 28 to gear boxes 30 which are each coupled to a lead screw 32. The lead screws 32 are connected to one of the pivotal seat back hinge plates 20 mounted on opposite sides of the seat adjuster 10 to provide selective pivotal adjustment of the seat back with respect to the seat bottom.

A horizontal drive means formed of a bi-directional electric motor 34 which is fixedly mounted to one of the upper tracks 52 by means of a suitable bracket 38. A pair of rotatable output shafts 40 extend outward from the horizontal drive motor 34 to a rotatable connection with a lead screw by a gear means mounted in opposed track assemblies as described hereafter. The output shafts 40 are, in an exemplary embodiment, flexible steel shafts covered by a polyurethane sleeve.

The seat adjuster 10 also includes a rear torsion bar or member 42 and a front torsion bar or member 44. This pair of tubular torsion bars or members 42 and 44 extend between and are connected to the opposed track assemblies 46 and 48 and provide a rigid support structure for the seat adjuster 10. As each of the track assemblies 46 and 48 is identically constructed, the following description will refer to only one track assembly 48. It will be understood that the opposite track assembly 46 is constructed in the same manner.

Figure 3:
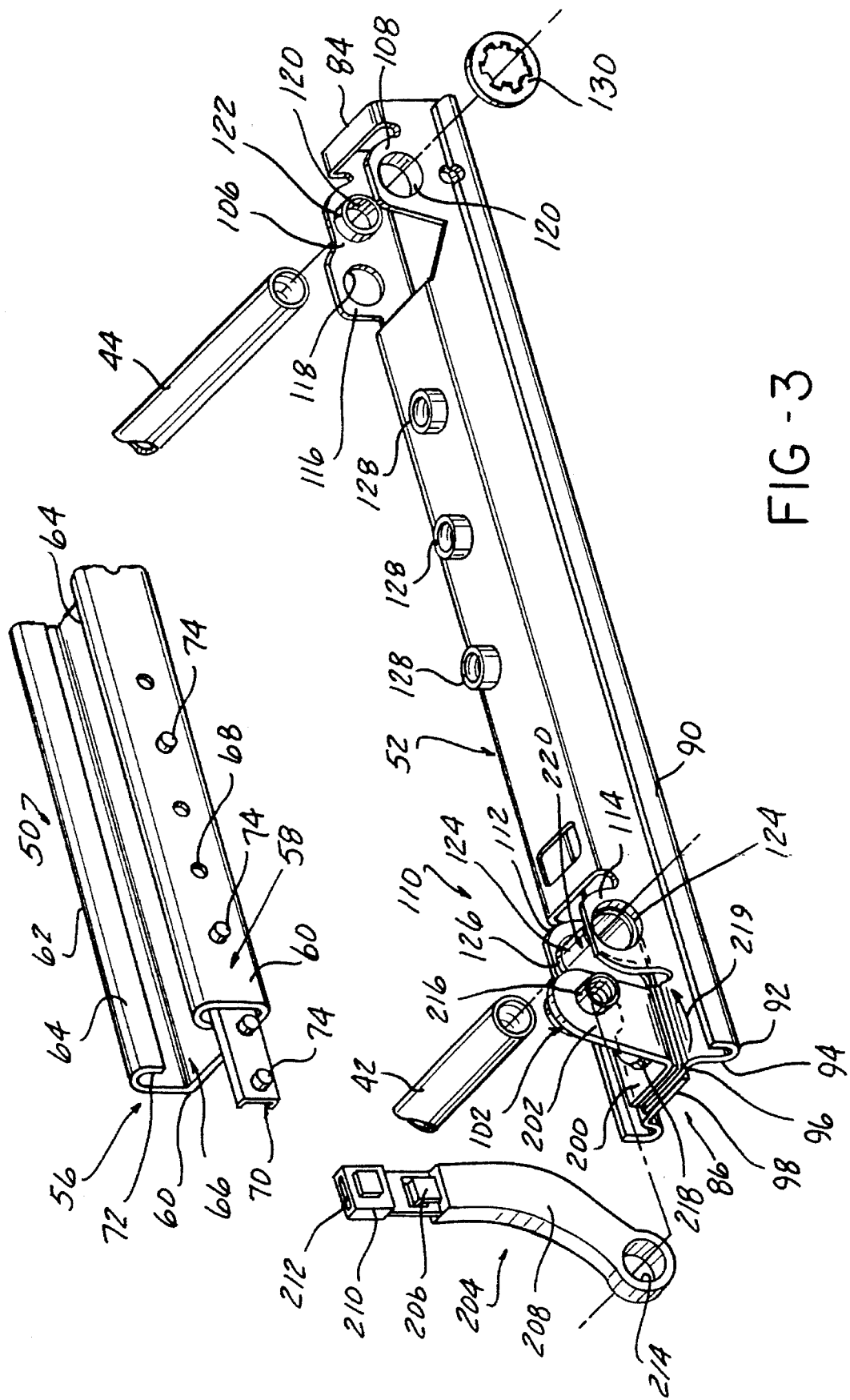
FIG. 3 is an exploded, perspective view showing the construction and mounting of the upper track of the present invention in a lower track.
Figure 4:
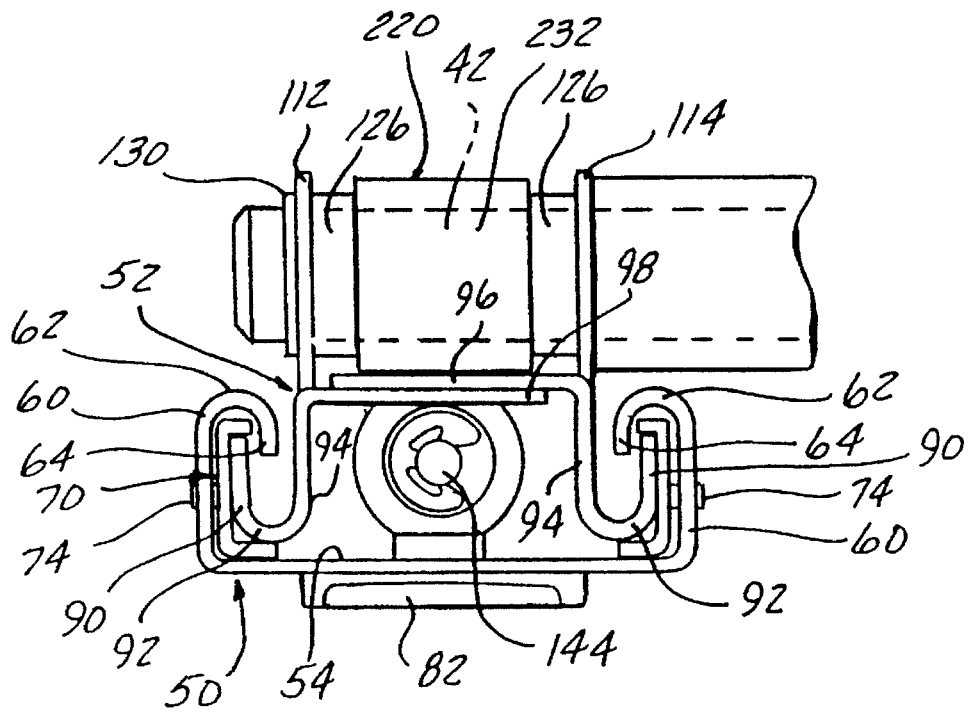
FIG. 4 is a left end view of the assembled upper and lower tracks shown in FIG. 3.

Referring now to FIGS. 1 and 2, and in detail to FIGS. 3 and 4, the track assembly 48 includes a lower track 50 and an upper track 52 which is slidably disposed within the lower track 50 and reciprocally movable bi-directionally along the lower track 50 under the control of the horizontal drive means 34. The lower track 50 is formed of an integral, one-piece member having a substantially planar central wall or web 54 and a pair of identically formed side walls 56 and 58 extending from opposite sides of the central wall 54. Each of the side walls 56 and 58 includes a vertically extending, outer side wall 60, a top wall 62 and an inward disposed lip or wall 64 which extends substantially vertically downward from the top wall 62 and is spaced from the outer side wall 60. The outer side wall 60, the top wall 62 and the inner wall 64 are formed in an inverted J-shape creating and surrounding a longitudinal extending channel 72. The lower edge of the inner wall 64 is spaced from the central wall 54 of the lower track 50 to define a longitudinally extending slot therebetween as denoted by reference number 66.

A plurality of spaced apertures 68 are formed in the outer side walls 60 of each side wall 56 and 58. A slide member or sleeve 70, only one of which is shown in FIG. 3, is mounted in each channel 72 formed by the spaced portions of the central wall 54, the outer side wall 60, the top wall 62 and the inner wall 64 on opposite sides of the lower track 50. The slide or sleeve 70 is substantially C-shaped and is complimentary to the shape of the channel 72. The sleeve 70 is formed of a suitable plastic material to provide a smooth sliding surface for the upper track 52, described hereafter, which is slidingly disposed within the slide or sleeve 70. A plurality of outwardly extending pins 74 are formed on and extend outward from a side wall of the slide or sleeve 70 and engage the apertures 68 in the outer side wall 60 of the corresponding side walls 56 and 58 of the lower track 50 to securely and position the slide or sleeve 70 in a stationary manner within the lower track 50.

As shown in FIG. 2, a front riser 80 and a rear riser 82 are attached to the lower track 50 at opposite ends thereof and provide a mounting connection to the vehicle floor by means of bolts or other suitable fasteners or anchors.

As shown in detail in FIG. 3, the upper track 52 is in the form of an elongated, one-piece, integrally formed member which is stamped, extruded, or otherwise formed from a suitable material, such as a high-strength, low alloy steel.

All of the various portions described hereafter which form a part of the upper track 52 are integrally formed with the entire upper track 52 and form an integral, continuous, unbroken, non-separate, part of the complete upper track 52. The upper track 52 includes a first end 84 and an opposed second end 86. A raised central portion or surface 88 extends between the first and second ends 84 and 86. The side walls of the upper track 52 are formed in a channel-like configuration complimentary to the shape of the channels 72 in the lower track 50 so as to enable the upper track 52 to be slidably disposed within the lower track 50 in sliding contact with the sleeves 70. Thus, each side wall of the upper track 52 is formed with a substantially J-shaped channel configuration formed of an outer side wall 90, a lower bottom wall 92 and an inner side wall 94 which extends to the central raised portion 88. The same channel-like configuration is also provided for the opposite longitudinal side wall of the upper track 52.

During the formation of the upper track 52, which is preferably by a stamping operation, a pair of overlapping flanges 96 and 98 are formed at the second end 86 of the upper track 52. Aligned apertures 100 are formed in each of the flanges 96 and 98 and provide a mounting point for the attachment of a seat belt buckle bracket 102 to the second end 86 of the upper track 52. The seat belt buckle bracket 102 provides an attachment point for a conventional seat belt buckle, not shown.

A first pair 104 of mounting flanges including spaced mounting flanges 106 and 108 are integrally formed in the upper track 52 adjacent the first end 84 thereof. A second pair 110 of mounting flanges including first and second mounting flanges 112 and 114 are integrally formed in the upper track 52 adjacent the overlapped flanges 96 and 98 at the second end 86 of the upper track 52. Each of the pairs 104 and 110 of mounting flanges is cut, such as by stamping, from the same material sheet used to form the entire one-piece upper track 52. After piercing, each pair of flanges 104 and 110 are then bent outwardly from the raised central portion 88 of the upper track 52 so as to be disposed in a substantially vertically extending position when the upper track 52 is mounted in its operating position in the seat adjuster 10. Each of the mounting flanges 106, 108, 112 and 114 forming the first and second pair of mounting flanges 104 and 110 is substantially identically constructed with the exception of the mounting flange 106 which has an elongated end portion 116. An enlarged aperture 118 is formed in the end portion 116 to enable the drive shaft 40 of the horizontal drive motor 34 to pass therethrough to its connection to the horizontal gear means, as described hereafter.

A pair of co-axial aligned apertures 120 are formed in the mounting flanges 106 and 108 of the first pair of mounting flanges 104. The apertures 120 are preferably formed by an extrusion process which creates an inwardly extending, annular collar 122 extending toward the opposed mounting flange 106 or 108. The aligned apertures 120 provide a mounting connection for the front tubular torsion bar 44 to the upper track 52 as described hereafter.

Similar coaxial apertures 124 are formed in the mounting flanges 112 and 114 of the second pair of mounting flanges 110 and are each formed with inwardly facing annular collars 126. The mounting apertures 124 provide a mounting connection for the other tubular torsion tube 42 as described hereafter.

Additionally, a plurality of longitudinally spaced apertures, each having an outwardly extending, annular collar 128 are formed on the raised central portion 88 of the upper track 52 and provide a mounting connection for a bracket used to attach the vertical drive motors 22 or 24 to each upper track 52.

As shown in FIG. 4, each torsion bar or tube, such as rear torsion tube 42, extends through the aligned apertures in the mounting flanges 112 and 114 and the annular collars 126 associated therewith to connect the torsion tube 42 to the upper track 52. A fastener 130, such as a conventional push nut, is mounted on the outer end of the torsion tube 42 to securely attach the torsion tube 42 to the mounting flange 114. Referring briefly to FIG. 1, each torsion tube, such as front torsion tube 44 is welded to a drive link 132 which is attached to the upper support, such as mounting bracket 16 or 18, and spaced from the side wall of the upper track 52.

Figure 6:
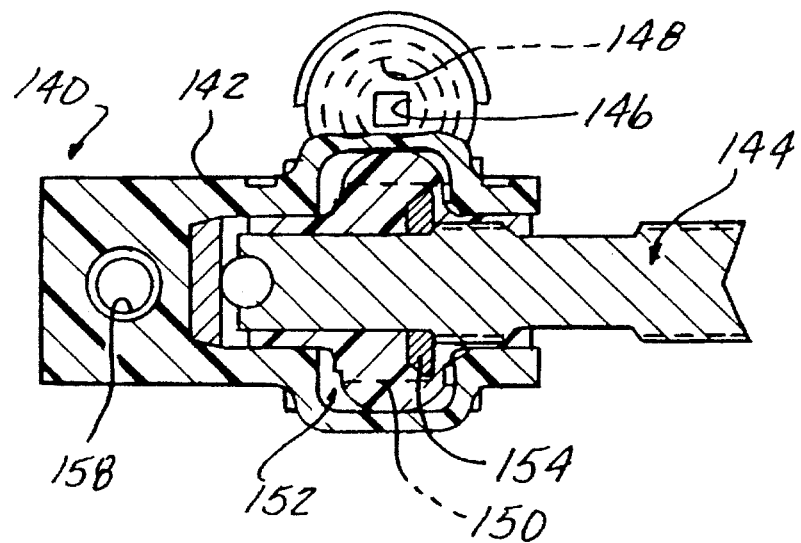
FIG. 6 is an enlarged, cross sectional view showing the gear means of the horizontal drive mechanism of the vehicle seat adjuster.
Figure 5:
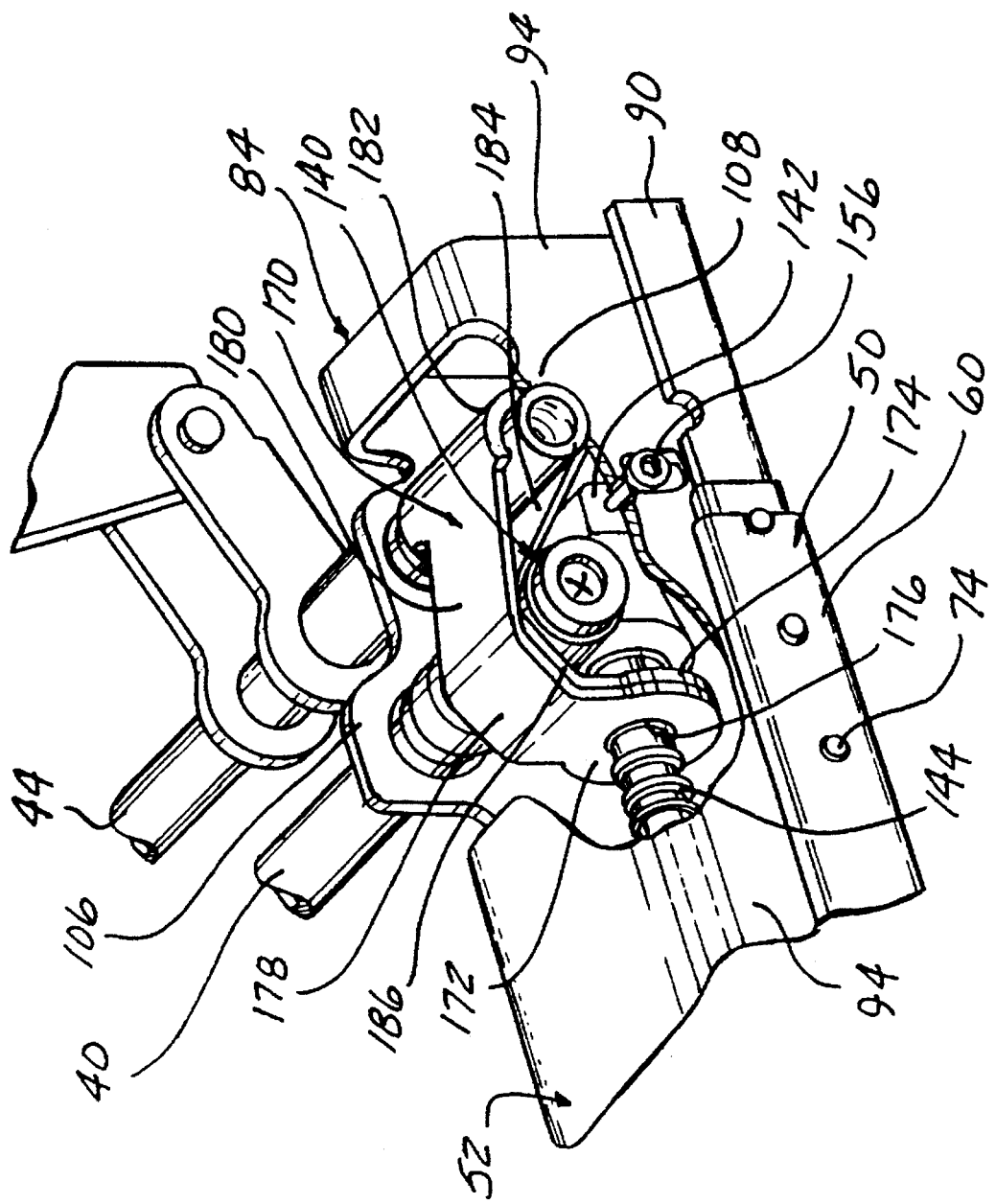
FIG. 5 is an enlarged, partial, perspective view showing a force transmitting front catcher bracket mounted on the vehicle seat adjuster.

Referring now to FIGS. 5 and 6, there is depicted a detailed illustration of a portion of the horizontal drive means which moves the upper track 52 in either direction along the lower track 50. A gear means or box denoted generally by reference number 140 is mounted beneath the central raised portion 88 of the upper track 52 adjacent the first end 84 of the upper track 52. The gear box 140 includes a lightweight plastic housing 142 which surrounds internal gears which translate rotation of the horizontal drive motor drive shaft 40 to rotation of the perpendicularly oriented horizontal lead screw 144. By way of example only, a worm 148 and a worm gear 152 are mounted within the housing 142 of the gear box 140. A substantially square slot 146 is formed in the worm 148 and receives one end of the horizontal drive motor output shaft 40. The worm 148 meshingly engages a helix thread 150 formed on the worm gear 152 mounted on one end of the lead screw 144. The worm gear 152 is preferably insert molded about a knurled end portion of the lead screw 144 as shown in FIG. 6. A metallic washer 154 is welded to the end portion of the lead screw 144 within the worm gear 152 to provide additional strength to the gear box 140, for reasons which will become more apparent hereafter. The worm 148 and the worm gear 152 are preferably formed of a high strength plastic, such as DELRIN™ or NYLON™.

A mounting pin 156 shown in FIG. 5 extends through a bore 158 in the housing 142 and engages opposed side walls 94 of the upper track 52 to mount the gear box 140 to the upper track 52.

As shown in FIG. 2, the lead screw 144 threadingly engages a drive block 160 which is mounted to the lower track 50 in a stationary manner by means of a screw or other fastener 162. In this manner, rotation of the lead screw 144 in either direction will result in a linear movement of the upper track 52 with respect to the stationary lower track 50 through the coupling between the lead screw 144 and the drive block 160.

Referring again to FIG. 5, in another embodiment of the present invention, means are provided for bypassing the gear box 140 and transmitting forces imposed on the upper track 52 around the gear box 140 to the lower track 50. The force transmitting bypass means 170 preferably is in the form of a front catcher strap or bracket which may have any suitable shape besides that illustrated in FIG. 5 and described hereafter. The shape of the front catcher strap 170 may be varied to provide a predetermined force versus load compliance characteristic such that the front catcher strap 170 exhibits controlled elongation under force loading. The front catcher strap 170 is preferably in the form of a thin, planar strip formed to the desired shape. The front catcher strap 170 is also, preferably, formed of a mild steel.

By way of example only, the front catcher strap 170, as shown in FIG. 5, is formed of an integral, one-piece member having first and second ends 172 and 174 bent or formed into an overlapping position substantially in registry with each other. Each of the first and second ends 172 and 174 is identically constructed and has an enlarged, substantially annular shape with a centrally located aperture 176 formed therein. A substantially planar, angularly disposed bent portion 178 extends continuously from the first end portion 172 to a horizontally oriented planar portion 180. The front catcher strap 170 loops in an arcuate, loop-shaped portion 182 about the front torsion tube 44 extending through the first end 84 of the upper track 52. The arcuate, loop-shaped portion 182 may or may not be in contact with the front torsion tube 44. Extending from the arcuate, loop-shaped portion 182 is a second substantially linear portion 184 which merges into an angularly disposed, substantially planar portion 186 disposed adjacent to the angularly disposed bent portion 178. The angularly disposed, planar portion 186 merges integrally into the enlarged second end portion 174.

In normal operation of the seat adjuster 10, the front catcher strap 170 merely rests in an inoperative position around the front torsion tube 44 and over the gear box housing 142. The enlarged first and second end portions 172 and 174 surround the lead screw 144, with the lead screw 144 extending through the apertures 176 in the first and second ends 172 and 174 of the front catcher strap 170 without impediment.

It will be noted that a similar front catcher strap 170 could be mounted around the gear box housing 142 on the front end 84 of the opposite track assembly of the seat adjuster 10, if a seat belt strap dispensing mount is desired on the opposite track assembly.

In low load situations, such as those resulting from low or slow speed collisions of the vehicle having the seat adjuster 10 mounted therein, the bypass means or front catcher strap 170 on each track assembly remains in a substantially inoperative condition. During such low load situations, a force will be imparted by the seat belt buckle to the seat belt buckle attachment bracket 102 mounted at the rear end 86 of the upper track 52 of one of the track assemblies. This load is then transferred through the seat belt buckle bracket 102 to the upper track 52 and then along the upper track 52 to the gear box housing 142 by the mounting pin 156 attached to the upper track 52. Although the gear box housing 142 is formed of a plastic material, under low load conditions, the gear box housing 142 will remain intact and thereby transmit the load through the worm gear 152 mounted therein to the lead screw 144. From the lead screw 144, the load is transferred through the drive block 160 to the lower track 50 which is securely anchored to the vehicle floor by means of the front and rear risers 80 and 82.

The force transmitting bypass means or front catcher strap 170 comes into operation during high load conditions which occur during high speed vehicle collisions. During such high load conditions, the loading is initially the same as that described above in that a force or load will be imparted through the seat belt buckle attachment bracket 102 to the upper track 52. The load is then transferred from the upper track 52 through the mounting pin 156 to the gear box housing 142. However, the high force or load will exceed the strength of the gear box housing 142 thereby fracturing the gear box housing 142. At the same time, during such high load conditions, the upper track 52 is moved forward toward the front of the vehicle which imparts an elongation or tension load on the front catcher strap 170. This brings the angular portions 178 and 186 of the front catcher strap 170 into contact with the upper portion of the gear box housing 142 thereby causing an elongation of the front catcher strap 170 and a controlled straightening of the angular portions 178 and 186 of the front catcher strap 170.

Even though the gear box housing 142 is fractured and unable to transmit the load therethrough, the washer 154 which is welded to the end of the lead screw 144 and insert molded within the worm gear 152 remains intact and transfers the load imparted by the first and second ends, 172 and 174 respectively, of the front catcher strap 170 to the lead screw 144 where it is again transmitted through the drive block 160 to the lower track 50 which is securely anchored to the vehicle floor. In this manner, the forces imparted on the seat adjuster 10 during low and high speed collisions are effectively transmitted through the various components of the seat adjuster 10 to the vehicle floor to prevent any undesirable movement of the seat adjuster 10 and the seat attached thereto during a collision. In the particular situation of a high speed collision which generates high impact forces on the seat adjuster 10, the front catcher strap 170 provides a force transmitting bypass path around the plastic gear box housing 142 which will fracture at a certain load and still enable the load to be transferred through the lead screw 144 and drive block 160 to the lower track 50 anchored to the vehicle floor.

Referring again to FIGS. 2 and 3, in current vehicle seat adjusters, such as the vehicle seat adjuster 10, the seat belt buckle mounting bracket 102 is mounted on one of the upper tracks 52 of the first and second track assemblies of the seat adjuster 10 and is movable therewith relative to the stationary lower track 50.

The seat belt buckle bracket mounting 102 is typically formed of a high strength metal and, preferably, has an integral, one-piece construction. The seat belt buckle mounting bracket 102, in an exemplary embodiment, includes a first leg 200 and an angularly disposed second leg 202. The second leg 202 is typically disposed at an obtuse angle with respect to the first leg to present a suitable mounting surface for a fixed seat belt shown generally by reference number 204 in FIG. 3. As is conventional, the fixed seat belt 204 includes a short fixed belt portion 206 which may be mounted in a protective plastic sleeve 208. A seat belt buckle 210 is connected to an outer end of the fixed seat belt 206 and includes a socket 212 for receiving the tongue, not shown, of an extendable/retractable belt portion of the seat belt system employed in a vehicle. One end of the fixed seat belt 206 and the fixed seat belt housing or sleeve 208 is provided with a through bore 214 which rotatably engages and is retained on an outwardly extending collar 216 formed on the upper end of the second leg 202 of the seat belt buckle mounting bracket 102.

In FIG. 3, the seat belt buckle mounting bracket 102 is shown in a first, normal mounting position for normal use of the seat adjuster 10 during operation of the vehicle. In the first, normal position, the second leg 202 extends upward from the upper track 52 and is located adjacent to the side wall 94 of the upper track 52. The first leg 200 is attached to the upper track 52 by means of a suitable fastener 218 which provides the dual function of fixedly maintaining the seat belt buckle mounting bracket 102 in the first, normal position and, also, allowing the seat belt buckle mounting bracket 102 to rotate under a force or load applied to the seat belt buckle mounting bracket 102 during a frontal collision to a second, stronger geometry position as described hereafter.

Figure 7:
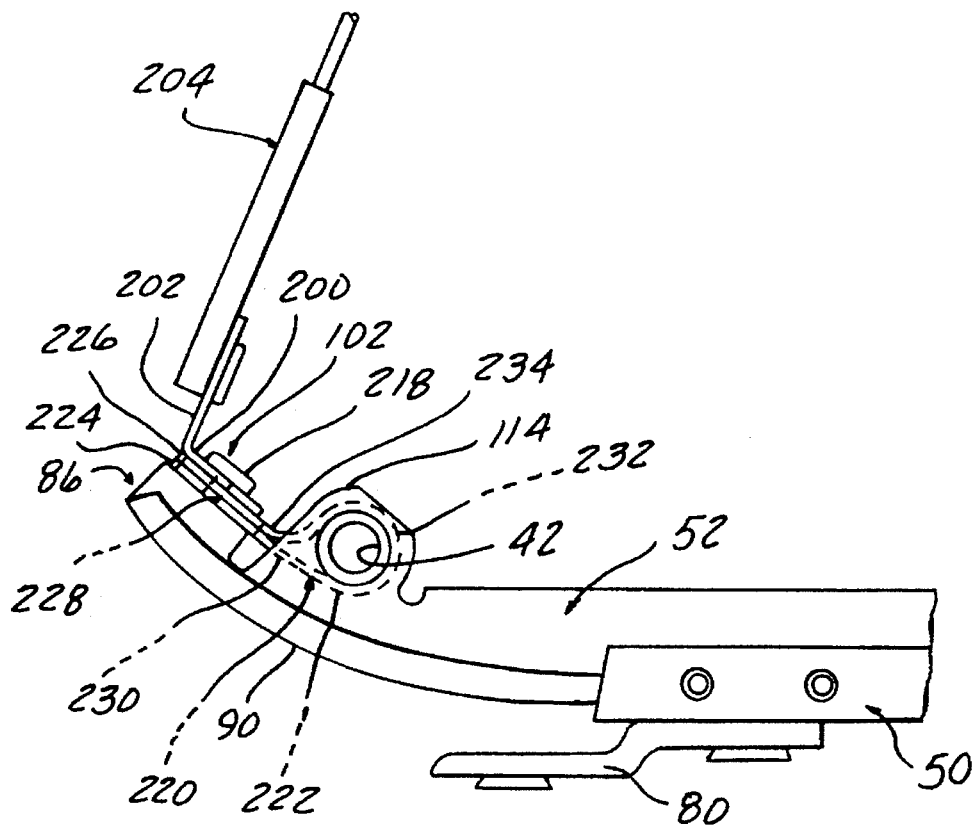
FIG. 7 and 8 are pictorial views showing the positions of the upper track and the seat belt buckle mounting bracket under increasing load conditions.

During the initial application of a load to the seat belt buckle bracket 102, as shown in FIG. 3, the seat belt buckle bracket 102 will initially rotate in the direction of arrow 219 toward the first end 84 of the upper track 52. However, the continued application of load through the fixed seat belt 204 to the seat belt buckle mounting bracket 102 will result in an opposite, clockwise rotation of the seat belt buckle mounting bracket 102 with respect to the upper track 52 toward the second end 86 of the upper track 52. Simultaneously, as such force or load increases, the rear end 86 of the upper track 52 will curl upward, as shown in FIG. 7, away from its normal, substantially planar, horizontal position. This curling of the second end 86 of the upper track 52 occurs simultaneously with the clockwise rotation of the seat belt buckle mounting bracket 102 until the seat belt buckle mounting bracket 102 assumes the second position shown in FIG. 7 in which the second leg 202 is substantially aligned with the longitudinal axis of the upper track 52. This second position is a stronger geometry position for the seat belt buckle mounting bracket 102 since the first and second legs 200 and 202, respectively, are positioned to receive a tensile force applied through the fixed seat belt 204 to the seat belt buckle mounting bracket 102.

Figure 8:
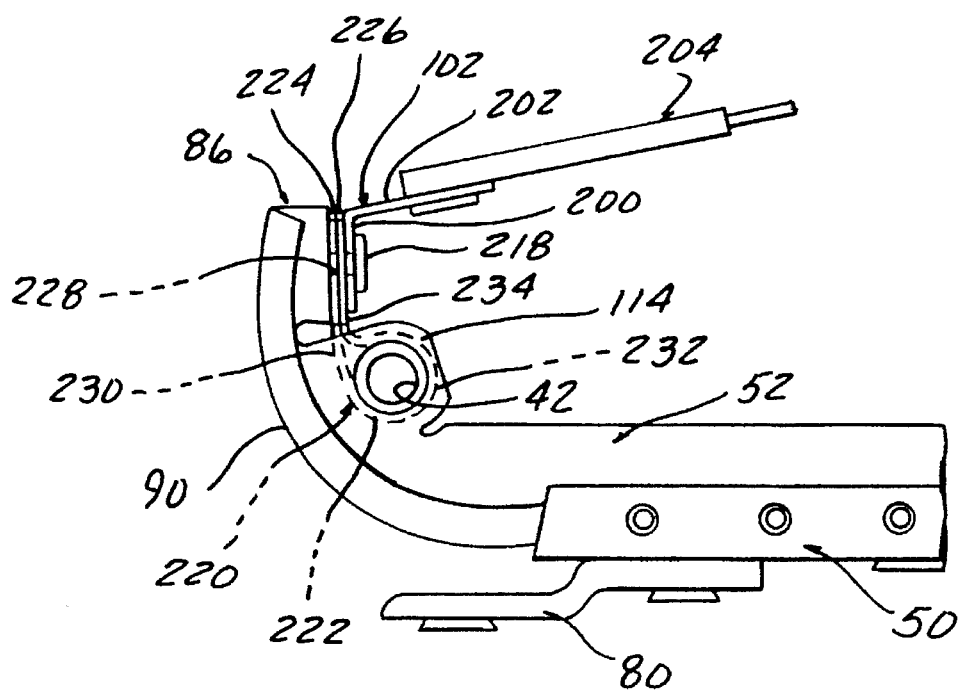

The continued application of increasing force to the seat adjuster 10 will cause a further curling or upward movement of the second end 86 of the upper track 52 with respect to the associated lower track 50 as shown in FIG. 8. This upward curling is accompanied with deformation of the upper track 52 and an increase in the angle between the first leg 200 and the second leg 202 of the seat belt buckle mounting bracket 102 due to the tensile force applied to the bracket 102. However, as this is a stronger geometry position, the seat belt buckle mounting bracket 102 remains integrally affixed to the upper track 52 to prevent separation or fracture of the bracket 102 from the upper track 52.

The attachment means 218 which provides such fixed attachment of the seat belt buckle mounting bracket 102 in a first, normal position and which also allows the seat belt buckle mounting bracket 102 to rotate to the second position shown in FIGS. 7 and 8, is formed, in a preferred embodiment, by a rivet which is mounted through aligned apertures formed in the first leg 200 of the seat belt buckle mounting bracket 102 and corresponding apertures formed in the overlapped flanges 96 and 98 at the second end 86 of the upper track 52. The rivet 218 allows such rotation of the seat belt buckle mounting bracket 102, as described above, yet retains the seat belt buckle mounting bracket 102 firmly attached to the upper track 52.

Figure 9:
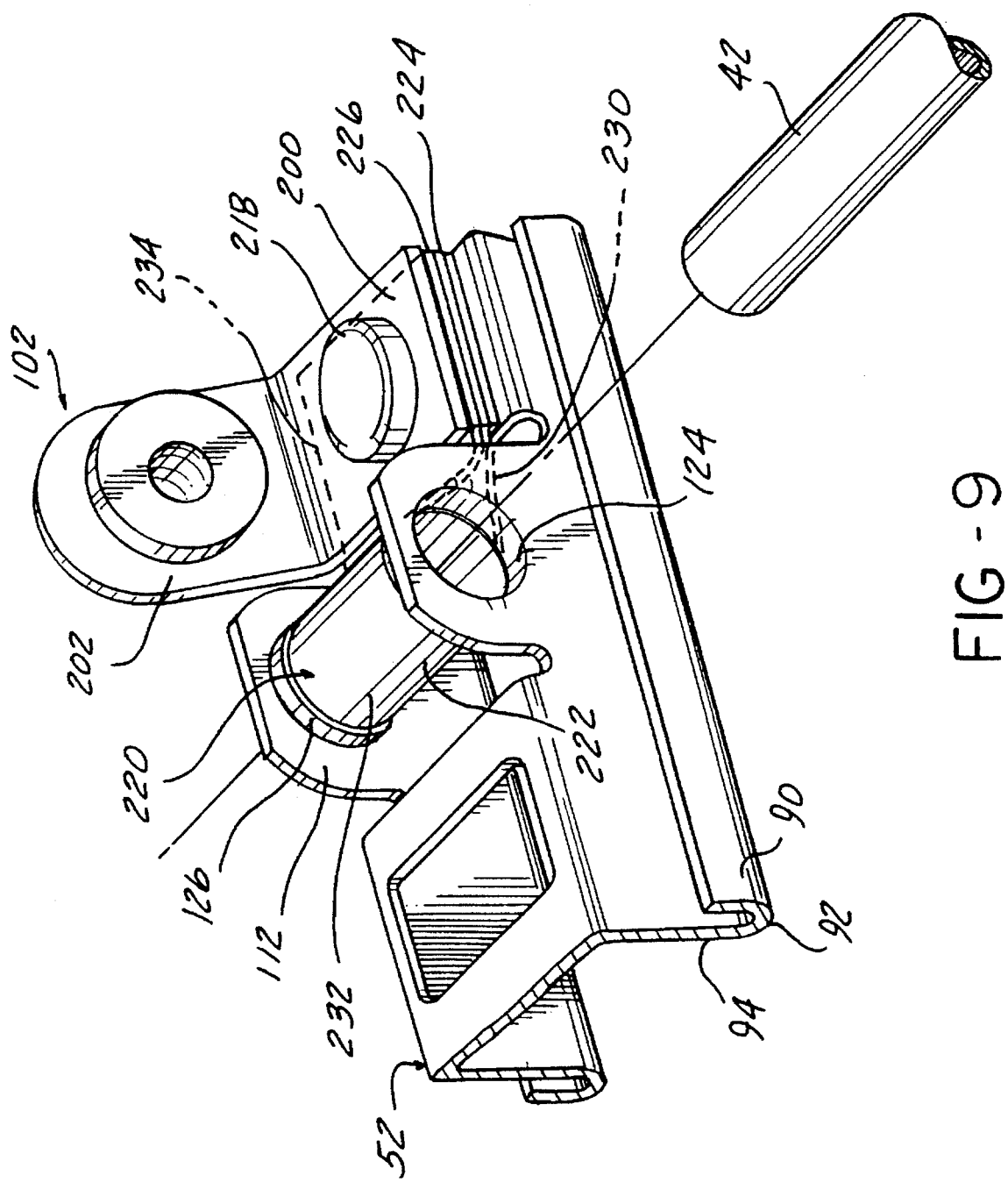
FIG. 9 is an enlarged, partial, perspective view of a force transmitting rear catcher bracket mounted on the upper track and seat belt buckle mounting bracket and encircling a rear torsion bar according to the present invention.

Referring now to FIGS. 1-4 and 7-9, and specifically FIG. 9, catcher bracket means 220 is provided for transferring at least a portion of the load from the seat belt buckle mounting bracket 102 to the rear torsion member 42 thereby strengthening the attachment structure and transmitting forces imposed on the upper track 52 to the lower track 50. The catcher bracket means 220 preferably is in the form of a rear catcher strap or bracket 222 which may have any suitable shape besides that illustrated in FIG. 9 and described hereafter. The shape of the rear catcher strap 222 may be varied to provide a predetermined force versus load compliance characteristic such that the rear catcher strap 222 exhibits controlled elongation under force loading. The rear catcher strap 222 is preferably in the form of a thin, planar strip formed to the desired shape. The rear catcher strap 222 is also, preferably, formed of a mild steel.

By way of example only, the rear catcher strap 222, as shown in FIG. 9, is formed of an integral, one-piece member having first and second ends, 224 and 226 respectively, bent or formed into an overlapping position substantially in registry with each other. Each of the first and second ends, 224 and 226 respectively, is identically constructed and has a centrally located aperture 228 formed therein. A first, substantially planar, portion 230 extends continuously from the first end 224 to an arcuate, generally bent-over or looped-shaped portion 232 adapted to substantially encircle the rear torsion member 42 extending through the second end 86 of the upper track 52. The bent-over, looped portion 232 extends continuously and integrally from the first portion 230 to a second, substantially planar, portion 234. The second portion 234 extends continuously to the second end 226 and is generally in registry with the first planar portion 230. The arcuate, loop-shaped portion 232 of the rear catcher strap 222 may or may not be in contact with the rear torsion member 42. In normal operation of the seat adjuster 10, the rear catcher strap 222 merely rests in an inoperative position around the rear torsion tube 42. It should be noted that a similar rear catcher strap 222 could be mounted around the rear torsion bar 42 on the second end 86 of the opposite track assembly of the seat adjuster 10, if a seat belt strap dispensing mount is desired connected to the upper track of the opposite track assembly.

In low load situations, such as those resulting from low or slow speed collisions of the vehicle having a seat adjuster 10 mounted therein, the rear catcher strap remains in a substantially inoperative condition. During such low load situations, a force will be imparted by the seat belt buckle to the seat belt buckle attachment bracket 102 mounted at the rear end 86 of the upper track 52 of at least one of the track assemblies. This load is then transferred through the seat belt buckle bracket 102 to the upper track 52 and then along the upper track 52 to the gear box housing 142 by the mounting pin 156 attached to the upper track 52. The load is then transferred to the lower track 50 which is securely anchored to the vehicle floor by means of the front and rear risers, 80 and 82 respectively.

During high load conditions such as occur during high speed vehicle collisions, the rear catcher bracket means 220 comes into operation. During such high load conditions, the loading is initially the same as that described above in that a force or load will be imparted through the seat belt buckle attachment bracket 102 to the upper track 52. The high load will eventually exceed the strength of the upper track, and the upper track will bend upward as shown in FIGS. 2 and 3. The rear catcher strap 222 will then transfer at least a portion of the load from the seat belt buckle bracket 102 to the rear torsion member 42, thereby increasing the ultimate load that can be carried by the structure before failure occurs.

If the rear catcher means 220 is used in combination with the rotatable seat belt buckle bracket 102 described above and subjected to high load conditions, the rotatable seat belt buckle bracket 102 would initially be in the first position until the initial application of load rotates the bracket 102 into the second, stronger geometry position as described above. As additional load is applied to the bracket 102, the high load will eventually exceed the strength of the upper track 52, and the upper track 52 will bend upward as shown in FIGS. 2 and 3. The rear catcher strap 222 will then transfer at least a portion of the load from the seat belt buckle bracket 102 to the rear torsion member 42, thereby increasing the ultimate load that can be carried by the assembly before failure occurs.

If the rear catcher means 220 is used in combination with the rotatable seat belt bracket 102 and/or the front catcher strap 170, and a high load is imposed to the assembly, the load will be transferred as described above with the additional benefit of the rear catcher strap 222 transferring at least a portion of the load from the bracket 102 to the torsion member 42, thereby increasing the ultimate load that can be carried by the assembly before failure occurs.

In summary, the rear catcher strap 222 or catcher bracket buckle brace permits higher loads during static loading and greater reliability in the buckle system. The manufacturing process is improved by eliminating the problems with welds previously used on the seat belt buckle bracket 102. Common problems with welds included no welds, cold welds, missing welds, incomplete welds and blow through weld Splatter, all of which had adverse impacts on the ultimate strength of the assembly. Eliminating welds also reduces the installation processing time, by reducing part handling during the required welding operations. The use of the rear catcher strap 222 in place of the welded plate for the seat belt buckle bracket, allows the force to be shared with the rear torsion bar 42, thereby increasing the load capable of being carried by the assembly before failure. The rear catcher strap 222 of the present invention preferably is used with the rotatable seat belt buckle bracket 102, sometimes referred to as a "swivel type" buckle bracket, in a power seat adjustor assembly, preferably including the front catcher strap 170 around the gear box housing as described above.

The rear catcher strap 222 is mounted so that the inboard side of the rear torsion bar 42 slips through the loop-shaped portion 232. The mounted ends 224, 226 of the rear catcher strap 222 rest on top of the folded over flanges 96, 98 of the upper track 52. The mounted ends 224, 226 are preferably interposed on top of the flanges 96, 98 and between the upper track 52 and the buckle bracket 102. The tendant of the buckle bracket rivet 218 slips through the buckle bracket 102, through the catcher strap apertures 228 and finally through the upper track 52. The end of the rivet tendant can then be upset by means of orbital forming. During forward loading of the track assembly, the upper track 52 deflects upward causing the catcher strap 222 to be in tension between the buckle bracket 102 and the rear torsion bar 42. This prevents the upper track 52 from taking all of the load by sharing it with the rear torsion bar 42. The end result is higher ultimate loads for the assembly and a change in failure mode from the buckle bracket 102 to the rear riser 82.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an adjustable track assembly supporting a seat of a vehicle from a floor pan of the vehicle, the track assembly including an inboard lower track and an outboard lower track adapted to be anchored to the floor pan of the vehicle in a stationary manner, an inboard upper track and an outboard upper track adapted to support the seat, the inboard and outboard upper tracks movably mounted with respect to the inboard and outboard lower tracks, means for selectively, reciprocally, adjusting each upper track with fore and aft movement relative to the corresponding stationary lower track, at least one torsion member connected between the inboard and outboard upper tracks, a seat belt buckle and seat belt buckle attachment means for attaching the seat belt buckle to the upper track, the seat belt buckle attachment means comprising:

catcher bracket means connected between the upper track and the torsion member for transferring at least a portion of a high load force through the seat belt buckle and the upper track to the torsion member.

2. In an adjustable track assembly supporting a seat of a vehicle from a floor pan of the vehicle, the track assembly including a lower track adapted to be anchored to the floor pan of the vehicle in a stationary manner, an upper track adapted to support the seat, the upper track movably mounted with respect to the lower track, means for selectively, reciprocally, adjusting the upper track with fore and aft movement relative to the stationary lower track, at least one torsion member connected to the upper track, a seat belt buckle and seat belt buckle attachment means for attaching the seat belt buckle to the upper track, the seat belt buckle attachment means comprising:

catcher bracket means connected between the upper track and the torsion member for transferring at least a portion of a high load force through the seat belt buckle and the upper track to the torsion member, wherein said catcher bracket means includes an elongated catcher strap having first and second ends with apertures formed adjacent each end, said catcher strap having a longitudinally extending loop, such that said aperture in said first end is disposed coaxially with respect to said aperture in said second end and said loop is disposed around said torsion member, and a fastener, disposed through said coaxial apertures of said catcher strap, for connecting said seat belt buckle to said upper track.

3. In an adjustable track assembly supporting a seat of a vehicle from a floor pan of the vehicle, the track assembly including a lower track adapted to be anchored to the floor pan of the vehicle in a stationary manner, an upper track adapted to support the seat, the upper track movably mounted with respect to the lower track, means for selectively, reciprocally, adjusting the upper track with fore and aft movement relative to the stationary lower track, at least one torsion member connected to the upper track, a seat belt buckle and seat belt buckle attachment means for attaching the seat belt buckle to the upper track, the seat belt buckle attachment means comprising:

catcher bracket means connected between the upper track and the torsion member for transferring at least a portion of a high load force through the seat belt buckle to the torsion member;

an attachment member having first and second angularly disposed legs, the second leg adapted to be connected to said seat belt buckle; and means for fixedly attaching the catcher bracket means and the first leg of the attachment member to the upper track in a fixed, normal operating position and for allowing rotation of the attachment member with respect to the means for fixedly attaching to a second position relative to the upper track in response to a predetermined force applied to the attachment member through the seat belt buckle, wherein the first and second legs of the attachment member are placed in tension when in the second position.

4. The seat belt buckle attachment means of claim 3 wherein the attachment member is an integral, one-piece attachment member.

5. The seat belt buckle attachment means of claim 3 wherein the second leg of the attachment member is disposed at an obtuse angle with respect to the first leg thereof.

6. The seat belt buckle attachment means of claim 5 wherein in the first, normal operating position, the second leg extends upward from a side wall of the upper track.

7. The seat belt buckle attachment means of claim 6 wherein in the second position, the second leg of the attachment member is substantially coaxial with the longitudinal axis of the upper track.

8. The seat belt buckle attachment means of claim 3 wherein the means for fixedly attaching further comprises:

a rivet mounted through an aperture in the first leg of the attachment member and a coaxial aperture formed in the upper track.

9. A seat belt buckle load transferring apparatus for a seat in a vehicle having a floor pan, said seat having an upper track moveable longitudinally with respect to a lower track, at least one torsion member connected to the upper track and a seat belt buckle, the seat belt buckle load transferring apparatus comprising:

an attachment member having first and second angularly disposed legs, the second leg adapted to be attached to the seat belt buckle;

means for fixedly attaching the first leg to the upper track of the seat in a fixed, normal operating position and for allowing rotation of the attachment member with respect to the means for fixedly attaching to a second position relative to the upper track in response to a predetermined force applied to the attachment member through the seat belt buckle, wherein the first and second legs of the attachment member are placed in tension when in the second position; and catcher bracket means connected between the upper track and the torsion member by the means for fixedly attaching, said catcher bracket means for transferring at least a portion of a high load force through the attachment member and the upper track to the torsion member.

10. The seat belt buckle load transferring apparatus of claim 9 wherein said catcher bracket means further comprises:

an elongated catcher strap having first and second ends with apertures formed adjacent each end, said catcher strap having a longitudinally extending loop, such that said aperture in said first end is disposed coaxially with respect to said aperture in said second end and said loop is disposed around said torsion member; and said means for fixedly attaching including a fastener, disposed through said coaxial apertures of said catcher strap, for mounting said attachment member to said upper track.

11. The seat belt buckle load transferring apparatus of claim 9 wherein the attachment member is an integral, one-piece member.

12. The seat belt buckle load transferring apparatus of claim 9 wherein the second leg of the attachment member is disposed at an obtuse angle with respect to the first leg thereof.

13. The seat belt buckle load transferring apparatus of claim 9 wherein in the first, normal operating position, the second leg extends upward from a side wall of the upper track.

14. The seat belt buckle load transferring apparatus of claim 9 wherein in the second position, the second leg of the attachment member is substantially coaxial with the longitudinal axis of the upper track.

15. The seat belt buckle load transferring apparatus of claim 9 wherein the means for fixedly attaching further comprises:

a rivet mounted through an aperture in the first leg of the attachment member and a coaxial aperture formed in the upper track.

16. The seat belt buckle load transferring apparatus of claim 9 further comprising:

front catcher bracket means connected between the upper track and the lower track for transmitting high load forces imparted to the upper track to the lower track, the high load forces tending to move the upper track in a forward direction with respect to the lower track.

17. The seat belt buckle load transferring apparatus of claim 16, wherein said front catcher bracket means further comprises:

an elongated front catcher strap having first and second ends and a longitudinally extending loop between said first and second ends, said loop disposed around said front torsion member and said ends connected to said lower track.

18. The seat belt buckle load transferring apparatus of claim 9 further comprising:

said seat further including a power seat apparatus for said vehicle having inboard and outboard spaced track assemblies, each track assembly formed of said lower track fixedly mounted to the vehicle floor and said upper track slidably disposed within each lower track;

a front tubular torsion member connected between the upper tracks of the inboard and outboard track assemblies;

said attachment member further including a seat belt buckle attachment member connected to a rear portion of the inboard upper track;

a drive motor having first and second rotatable output shafts, said output shafts respectively extending toward opposite inboard and outboard upper tracks;

a lead screw disposed between each upper and lower track;

a drive block fixedly mounted to each lower track and threadingly engaging the lead screw;

gear means fixedly mounted to each upper track and coupling one of the motor output shafts to one lead screw, the gear means including a plurality of meshingly engaged gears, at least one gear formed of a plastic material and having a metallic inner annular member fixedly attached to the lead screw; and front catcher bracket means, disposed in a force transmitting position between the front torsion member of each upper track and each lead screw associated therewith, for transmitting high load forces imparted on the upper track around and bypassing the gear means, wherein said high impact forces tend to move the upper track in a forward direction with respect to the lead screw.

19. The power seat apparatus of claim 18 wherein said catcher bracket means further comprises:

an elongated rear catcher strap having first and second ends with apertures formed adjacent each end, said catcher strap having a longitudinally extending loop, such that said aperture in said first end is disposed coaxially with respect to said aperture in said second end and said loop is disposed around said torsion member; and a fastener, disposed through said coaxial apertures of said catcher strap, for mounting said seat belt buckle attachment member to said inboard upper track.

20. The power seat apparatus of claim 18 further comprising:

said seat belt buckle attachment member having first and second angularly disposed legs, the second leg adapted to be attached to the seat belt buckle; and means for fixedly attaching the catcher bracket means and the first leg of the seat belt buckle attachment member to the inboard upper track in a fixed, normal operating position and for allowing rotation of the attachment member with respect to the means for fixedly attaching to a second position relative to the inboard upper track in response to a predetermined force applied to the attachment member through the seat belt buckle, wherein the first and second legs of the attachment member are placed in tension when in the second position.

\* \* \* \* \*